March 19, 1957 M. MALLORY 2,785,663
INTERNAL COMBUSTION ENGINE
Filed Nov. 28, 1955 3 Sheets-Sheet 1
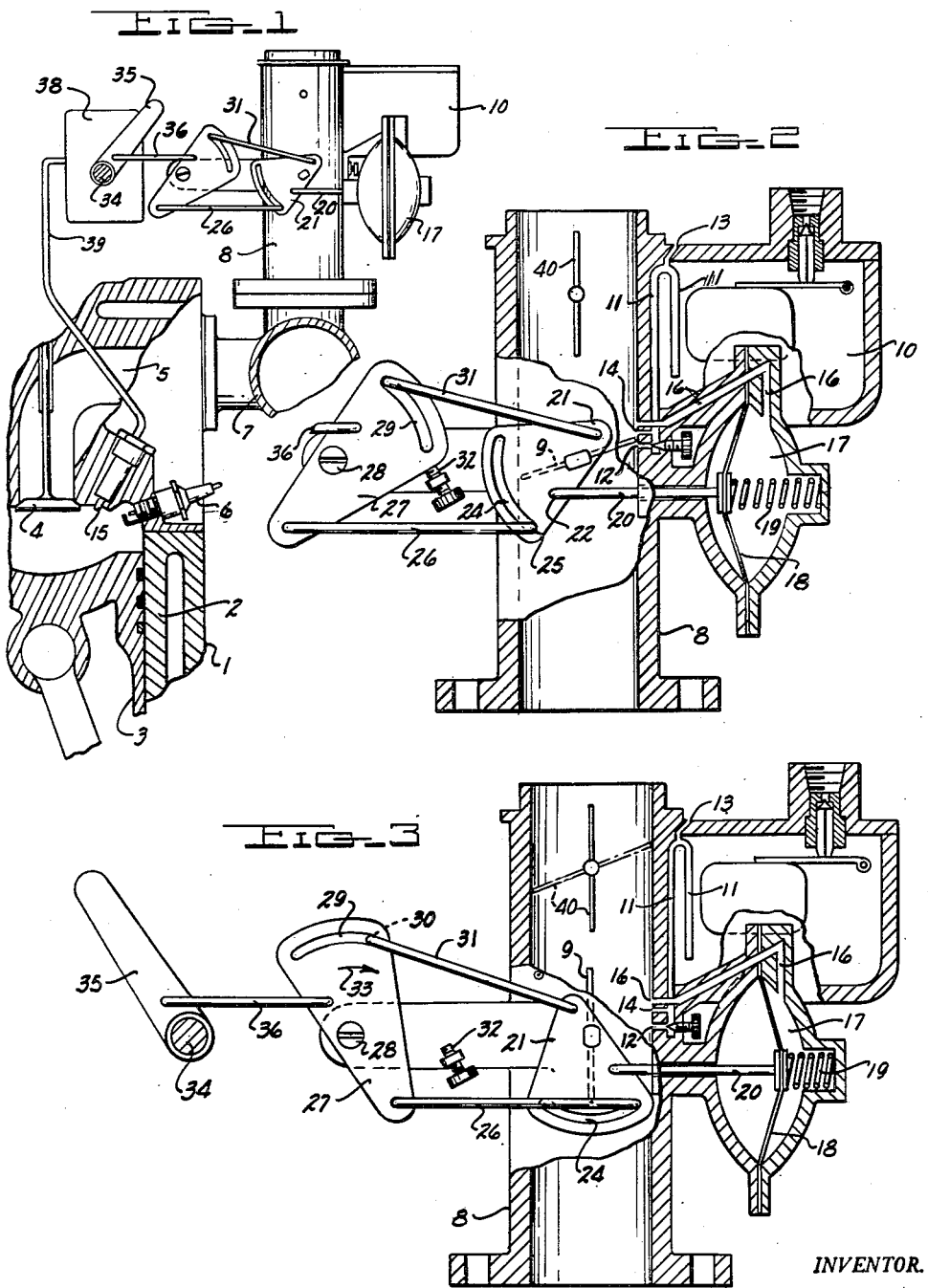
INVENTOR.
MARION MALLORY
BY
SMITH, OLSEN & KOTTS
ATTORNEYS

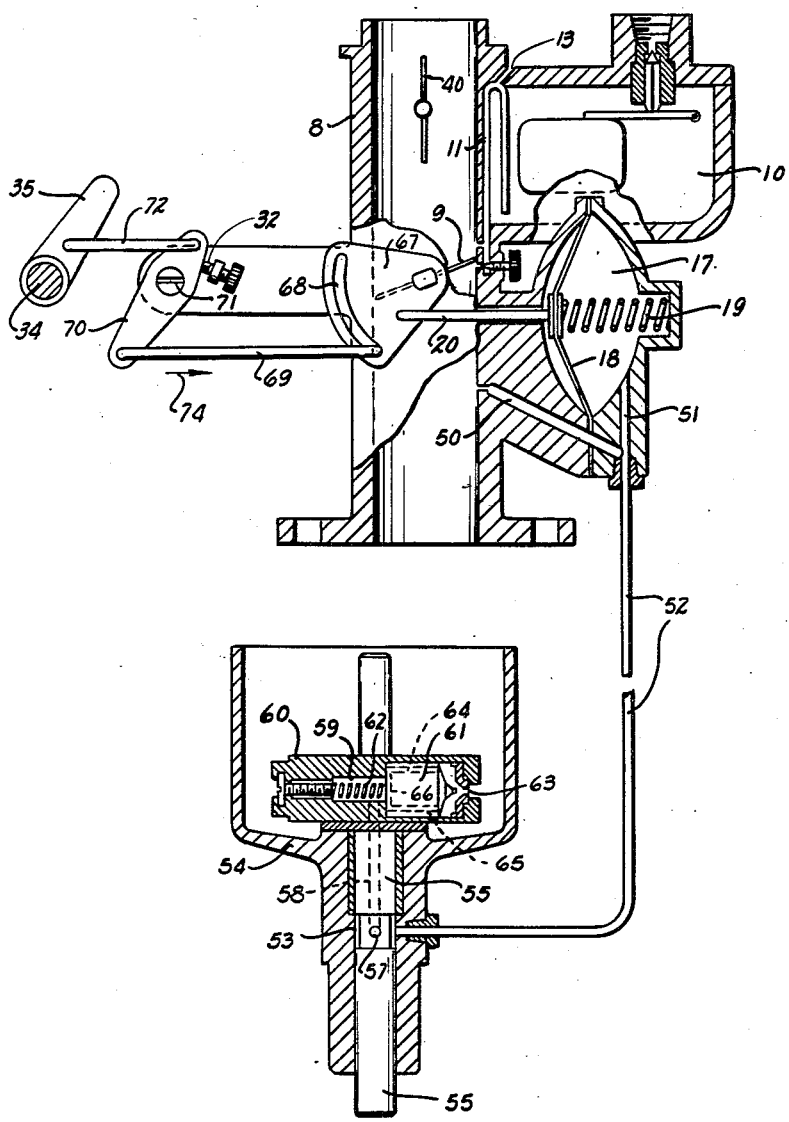

March 19, 1957     M. MALLORY     2,785,663
INTERNAL COMBUSTION ENGINE
Filed Nov. 28, 1955     3 Sheets-Sheet 3
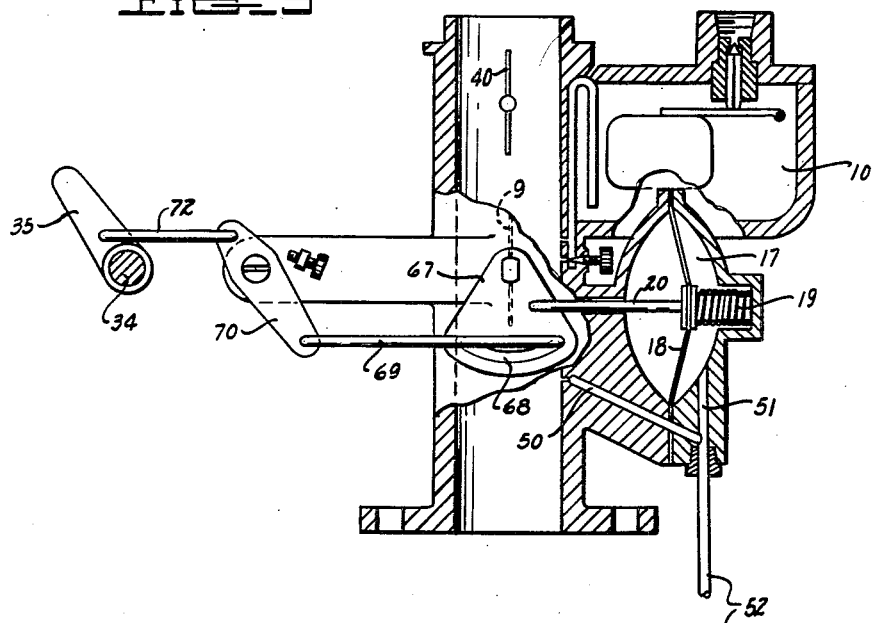
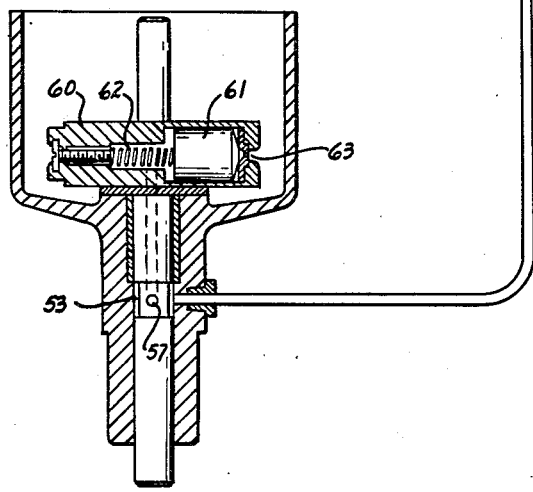
INVENTOR.
MARION MALLORY
BY
SMITH, OLSEN & KOTTS
ATTORNEYS United States Patent Office 2,785,663
Patented Mar. 19, 1957

2,785,663

INTERNAL COMBUSTION ENGINE

Marion Mallory, Detroit, Mich.

Application November 28, 1955, Serial No. 549,425

18 Claims. (Cl. 123—30)

This invention relates to an internal combustion engine, and mechanism for operating the engine on fuel from the carburetor at idling and low part throttle speeds and on injected fuel at higher speeds.

Previous engines have for the most part been run entirely on fuel from the carburetor or entirely on injected fuel. When an engine is run entirely on fuel from the carburetor the engine efficiency at higher speeds and heavier loads is somewhat reduced, partly because the carburetor venturi throat unduly restricts the amount of air to the cylinders and partly because the carburetor does not mix the air and fuel properly for efficient combustion.

When an engine is run entirely on injected fuel the fuel injector mechanisms and pump mechanisms must be held to very close tolerances so as to give very fine fuel injections at idling and low part throttle speeds; otherwise the engine will operate at reduced efficiency when idling and under part throttle. Even when the injectors are held to close tolerances the spray from the injectors is not strong enough at low engine speeds to reach the spark and ignite properly.

In United States Patent No. 2,534,346, issued to W. N. Fenney on December 19, 1950, it is proposed to run an engine entirely on fuel from the carburetor at idling speeds, and on a combination of such fuel with injected fuel above idling speeds. However, a standard carburetor is employed, and the carburetor venturi throat (numeral 35 in Fenney) so restricts air flow that it is necessary to employ an auxiliary mechanism (numerals 51 and 52 in Fenney) for supplying additional air at higher engine loads.

In Fenney the carburetor is at all times feeding fuel to the engine, so that comparatively small amounts of fuel are supplied by the injectors. The injectors and pumping mechanisms must be held to close tolerances to give the necessary fine fuel injections. Such fuel injections mechanisms are comparatively high cost items, and it is desirable that their cost be reduced.

Under the present invention the engine is run entirely on fuel from the carburetor at idling and low part throttle speeds and entirely on injected fuel at higher speeds. The conventional high speed carburetor nozzle and venturi throat are eliminated. By eliminating the venturi throat sufficient quantities of air can be introduced into the engine at higher engine loads (without resort to the auxiliary mechanisms 51 and 52 of Fenney). By eliminating the high speed carburetor nozzle the injectors can be made to provide the entire fuel supply at higher speeds. Since the injectors supply relatively large quantities of fuel they can be constructed as coarse mechanisms. Coarse injector mechanisms are advantageous by reason of their low cost and ability to operate effectively in spite of fuel leakage, as by reason of wear on pump barrels and plungers. The fuel pressure developed by the injector pump is directly proportional to the engine speed, and due to the fact that the injectors operate only in the high engine speed range they can be set to spray the fuel toward the spark at sufficient pressure without danger that the fuel will dribble out of the injectors or otherwise miss the spark.

The invention takes advantage of the fact that at higher engine loadings greater engine efficiencies and greater compression ratios are obtained by injecting the entire fuel supply, while at idling speeds greater engine efficiencies are obtained by taking the entire fuel supply from the carburetor.

Objects of the invention are to:

1. Provide for increased engine efficiencies at idling speeds and under heavy loads, 2. Provide increased engine efficiencies through the entire range of engine speeds by running entirely on carburetors at idling and low part throttle speeds and entirely on injectors at higher speeds, 3. Provide a combination carburetor and injector fuel supply arrangement wherein the injectors and pumping mechanisms can be coarse, low cost items, 4. Provide a combination carburetor and injector fuel supply arrangement wherein the engine can be supplied with sufficient quantities of air at high engine speeds, and 5. Provide a combination carburetor and injector fuel supply arrangement wherein the high speed carburetor nozzle mechanism can be eliminated.

Other objects of this invention will appear in the following description and appended claims, reference being had to the accompanying drawings forming a part of this specification wherein like reference characters designate corresponding parts in the several views.

In the drawings:

Fig. 1 is an elevational view of an engine and fuel supply mechanism constructed according to the invention.

Fig. 2 is a sectional view through a carburetor which forms part of the fuel supply mechanism shown in Fig. 1. Fig. 2 is taken with the throttle closed and the engine idling.

Fig. 3 is a sectional view through the Fig. 2 carburetor taken with the throttle open and the engine operating at above-idling speeds.

Fig. 4 is a sectional view through a carburetor and control mechanism which can be employed in place of the carburetor in the Fig. 1 construction. Fig. 4 is taken with the throttle closed and the engine idling.

Fig. 5 is a sectional view through the Fig. 4 carburetor and control mechanism with the throttle open and the engine operating at above-idling speeds.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a four stroke cycle gasoline engine 1 including a cylinder 2 and piston 3. The engine may be provided with any number of cylinders. An intake valve 4 admits fuel and air into cylinder 2 from passage 5, and a spark plug 6 ignites the fuel-air mixture in the cylinder. An injector 15 supplies cylinder 2 with fuel when the engine is operating at high speeds.

Passage 5 communicates with a manifold 7 which receives fuel and air from intake tube 8. A throttle valve 9 is pivotally mounted in tube 8 for movement from the closed Fig. 2 position to the open Fig. 3 position. A suitable choke valve 40 may be positioned upstream from valve 9 for cold starting.

A carburetor float chamber 10 is positioned adjacent tube 8, and a fuel tube 11 leads from chamber 10 to an idling nozzle 12. Lines 13 and 14 introduce air into tube 11 when valve 9 is closed.

When valve 9 is closed engine suction is concentrated at nozzle 12. The engine suction draws fuel from chamber 10 and air from ports 13 and 14. As valve 9 opens the engine suction acts on port 14 to draw fuel and air through both nozzle 12 and port 14. Further movement of valve 9 to the open position causes the suction on ports 12 and 14 to decrease and no longer draw fuel through these ports.

On the upstream side of valve 9 is a duct 16. Opening of valve 9 exposes duct 16 to engine suction. Duct 16 leads from tube 8 to a vacuum chamber 17. A flexible diaphragm 18 forms one wall of chamber 17, and suction in duct 16 is effective to move diaphragm 18 from a partly open position to the Fig. 3 fully open position against the action of compression spring 19.

A plunger 20 extends from diaphragm 18 to a triangular plate 21 which is fixedly secured on the pivot shaft of valve 9. Plunger 20 is provided with a turned end portion 22 which pivots in an opening in plate 21. Plate 21 is also provided with an arcuate slot 24 which receives the turned end portion 25 of a link 26. The opposite end of link 25 is pivotally connected to a triangular plate 27. Plate 27 is pivotally mounted on a fixed pivot 28. The upper end of plate 27 is provided with a slot 29 which received the turned end portion 30 of a link 31. The other end of link 31 is pivotally connected to plate 21. A screw 32 is provided for limiting movement of plate 27 in the direction of arrow 33 to the extent necessary to just close valve 9 without damaging the valve or link mechanisms.

To the left of plate 27 there is positioned a shaft 34 which is provided with an arm 35. A link 36 interconnects arm 35 with plate 27. The free end of arm 35 is connected to the conventional accelerator pedal or other manual actuator by conventional link mechanism (not shown). Shaft 34 extends into a conventional fuel pump 38, and pivotal movement of arm 35 causes shaft 34 to rotate so as to control the amount of fuel supplied by pump 38 to fuel line 39. The fuel pump may be driven by engine 1. When arm 35 is in the Fig. 3 position pump 38 is operable to pump maximum amounts of fuel through line 39 to injector 15. When arm 35 is in a position intermediate the Fig. 1 and Fig. 3 positions pump 38 is operable to furnish minimum amounts of fuel to injector 15. During pump operation valve 9 is in the fully open position, and fuel is therefore only injected when sufficient air can be taken in through tube 8 to give high compression operation.

The construction of elements is such that when valve 9 is closed the fuel and air mixture is drawn through port 12 to run the engine at idling speeds. As valve 9 opens in response to counterclockwise movement of arm 35 port 14 is exposed to engine suction and acts in conjunction with port 12 to supply increased amounts of fuel to the engine. When valve 9 is opened sufficiently to run the engine at about thirty miles per hour the suction on ports 12 and 14 is so low that fuel is no longer drawn from the carburetor. Very shortly before fuel flow through ports 12 and 14 is discontinued shaft 34 is put in a position to start fuel flow through injectors 15. Further movement of shaft 34 in the counterclockwise direction increases the amount of injected fuel. During return movement of arm 35 and shaft 34 in the clockwise direction, valve 9 remains in the fully open position (due to the presence of slots 29, 24 and the suction in line 16). Injection therefore occurs only on fully open throttle. As the engine speed drops below thirty miles per hour the engine suction on line 16 decreases sufficiently to permit diaphragm 18 to push plate 21 toward the Fig. 2 position. The provision of link mechanism 21, 26, 27, 31 permits valve 9 to remain fully open during injection, and the provision of diaphragm 18 permits valve 9 to follow the condition of arm 35 at low engine speeds.

The control arrangement shown in Figs. 4 and 5 is similar in operation to that shown in Figs. 2 and 3, and similar reference numerals are employed wherever applicable.

In lieu of duct 16 there is employed a duct 50 connected with tube 8 downstream from valve 9. Duct 50 connects with a duct section 51 leading to chamber 17, and a second duct section 52 leading to a chamber 53 formed in housing 54. Extending through housing 54 is a shaft 55 which is driven by engine 1, as for example through the ignition distributor shaft. The rotational speed of shaft 55 is proportional to the engine speed.

Shaft 55 includes a reduced portion 56 which is provided with a radial bore 57 in communication with an axial bore 58 and chamber 17. Bore 58 communicates with a bore 59 formed in a valve housing 60. There is slidably positioned in housing 60 a valve body 61. A tension spring 62 holds body 61 in the Fig. 4 position when the engine is on part throttle, but when the engine is operating at higher speeds the centrifugal forces on body 61 increase sufficiently to move said body to the Fig. 5 position against the action of tension spring 62.

In the Fig. 5 position body 61 closes opening 63 in housing 60. In the Fig. 4 position body 61 allows air from the atmosphere to pass through opening 63 in housing 60, bores 64 and 65 in body 61, groove 66 in body 61, bores 59, 58, and 57, chamber 53, duct sections 52 and 50, and tube 8.

When the engine is on part throttle and body 61 is in the Fig. 4 position, the air in duct 52 offers less resistance to engine suction than that in chamber 17. Consequently, spring 19 is effective to hold diaphragm 18 in the Fig. 4 position. When the engine is operating at higher speeds body 61 closes opening 63, and the engine suction is concentrated on diaphragm 18 so as to move it to the Fig. 5 position.

In the Fig. 2 arrangement the position of duct 16 upstream from valve 9 operates to shield diaphragm 18 from engine suction at idling and low part throttle speeds. In the Fig. 4 arrangement valve body 61 and duct section 52 operate to shield diaphragm 18 from engine suction.

In the Fig. 4 arrangement a slightly different link mechanism is employed between plunger 20 and shaft 34 than in the Fig. 2 arrangement. The end movements of shaft 34 and throttle 9 are, however, the same in both arrangements.

In the Fig. 4 arrangement a triangular plate 67 is fixedly secured on the shaft for valve 9. Plate 67 is provided with an arcuate slot 68 which receives the turned end portion of a link 69. A lever 70 is pivoted at 71 and connects with the other end of link 69. A second link 72 connects lever 70 with arm 35.

When shaft 34 is rotated in the counterclockwise direction rod 69 moves in the direction of arrow 74 to shift valve 9 to the fully open position before shaft 34 has rotated sufficiently to cause injector 15 to operate. Injection therefore takes place at fully open throttle.

When shaft 34 is rotated in the clockwise direction from the Fig. 5 position rod 69 is pulled to its Fig. 4 position. The decrease in engine speed automatically causes diaphragm 18 to move to the Fig. 4 position so as to close valve 9.

It will be appreciated that the Fig. 4 link mechanism 67, 69, 70, 72 can be interchangeably employed with the Fig. 2 link mechanism 21, 26, 31, 27, 36.

Having thus described my invention, I claim:

1. In an internal combustion engine; an intake manifold; a carburetor discharging into said manifold; a throttle valve between said carburetor and manifold; a vacuum chamber in communication with said manifold when said throttle valve is open but shielded therefrom when said throttle valve is closed; fuel injectors discharging into the engine cylinders; said vacuum chamber including wall means movable in response to vacuum changes in said chamber; and mechanism between said wall means and fuel injectors for (1) supplying fuel to said injectors when said vacuum chamber is in open communication with said manifold and (2) cutting off fuel to said injectors when said vacuum chamber is shielded from said manifold.

2. The combination of claim 1 wherein the vacuum chamber communicates with the manifold through a duct upstream from the throttle valve; whereby to shield the vacuum chamber from the manifold when the throttle valve is closed.

3. The combination of claim 1 wherein the vacuum chamber communicates with the manifold through a duct downstream from the throttle valve; and engine speed-responsive valve means is provided for opening said duct to the atmosphere at idling speeds; whereby to shield the vacuum chamber from the manifold when the throttle valve is closed.

4. In an internal combustion engine; an intake manifold; a carburetor discharging into said manifold; a throttle valve between said carburetor and manifold; fuel injectors discharging into the engine cylinders; a vacuum chamber in communication with the manifold; said vacuum chamber including wall means movable in response to vacuum changes in said chamber and mechanism between said wall means and fuel injectors for (1) supplying fuel to said injectors when said throttle valve is open and (2) completely cutting off fuel to the injectors when the throttle valve is closed.

5. In an internal combustion engine; an intake manifold; a carburetor discharging into said manifold; a throttle valve between said carburetor and manifold; fuel injectors discharging into the engine cylinders; an expansible-contractible vacuum chamber in communication with the manifold; and mechanism between said chamber and injectors for (1) supplying fuel to said injectors when said chamber is contracted and (2) cutting off fuel to the injectors when the chamber is expanded.

6. In an internal combustion engine; an intake manifold; a carburetor discharging into said manifold; a throttle valve between said carburetor and manifold; fuel injectors discharging into the engine cylinders; an expansible-contractible vacuum chamber in communication with the manifold; compression spring means in said chamber resisting contractive movement of said chamber; and mechanism between said chamber and injectors for (1) supplying fuel to said injectors when said chamber is contracted and (2) cutting off fuel to the injectors when the chamber is expanded.

7. In an internal combustion engine; an intake manifold; a carburetor discharging into said manifold; a throttle valve between said carburetor and manifold; fuel injectors discharging into the engine cylinders; said carburetor being devoid of a high speed nozzle but including an idling nozzle downstream from the throttle valve; an expansible-contractible vacuum chamber in communication with the manifold; and mechanism between said chamber and injectors for (1) supplying fuel to said injectors when the chamber is contracted and (2) cutting off fuel to the injectors when the chamber is expanded.

8. In an internal combustion engine; an intake manifold; a carburetor discharging into said manifold; a throttle valve between said carburetor and manifold; said carburetor being devoid of a high speed nozzle but including an idling nozzle downstream from the throttle valve; fuel injectors discharging into the engine cylinders; an expansible-contractible vacuum chamber in communication with the manifold, said chamber undergoing expansive movement during closing of the throttle and contractive movement during opening of the throttle; and mechanism between said chamber and injectors for supplying fuel to the injectors when said chamber is contracted and cutting off fuel to the injectors when said chamber is expanded.

9. In an internal combustion engine; an intake manifold having a fuel inlet tube; a throttle valve in said tube; a carburetor having an idling nozzle discharging into said tube downstream from the throttle valve; said carburetor being devoid of a high speed nozzle; fuel injectors discharging into the engine cylinders; a vacuum chamber communicating with the inlet tube upstream from the throttle valve; said vacuum chamber including wall means movable in response to vacuum changes in said manifold; and mechanism between said wall means and fuel injectors for (1) supplying fuel to said injectors when said wall means is exposed to manifold vacuum and (2) cutting off fuel to said injectors when said wall means is shielded from manifold vacuum by said throttle valve.

10. In an internal combustion engine; an intake manifold having a fuel inlet tube; a throttle valve in said tube; a carburetor discharging into said tube; said carburetor being devoid of a high speed nozzle but including an idling nozzle downstream from the throttle valve; fuel injectors discharging into the engine cylinders; a vacuum chamber exposed to manifold vacuum when said throttle valve is open but shielded from manifold vacuum when said valve is closed; said vacuum chamber including wall means movable in response to vacuum changes in said chamber; and mechanism between said wall means and fuel injectors for (1) supplying fuel to said injectors when said wall means is exposed to manifold vacuum and (2) cutting off fuel to said injectors when said wall means is shielded from manifold vacuum.

11. The combination of claim 10 wherein the vacuum chamber communicates with the manifold through a duct upstream from the throttle valve; whereby to shield the vacuum chamber from the manifold when the throttle valve is closed.

12. The combination of claim 10 wherein the vacuum chamber communicates with the manifold through a duct downstream from the throttle valve; and engine speed responsive valve means is provided for opening said duct to the atmosphere at idling speeds; whereby to shield the vacuum chamber from the manifold when the throttle valve is closed.

13. In an internal combustion engine; an intake manifold; a carburetor discharging into said manifold; a throttle valve between said carburetor and manifold; said carburetor being devoid of a high speed nozzle but including an idling nozzle downstream from the throttle valve; fuel injectors discharging into the engine cylinders; and mechanism responsive to openings of the throttle valve for supplying fuel to said injectors, and responsive to closing of the throttle valve for completely cutting off fuel to said injectors.

14. In an internal combustion engine; an intake manifold; carburetor means discharging into said manifold; throttle valve means between said carburetor means and manifold; fuel injectors discharging into the engine cylinders; manually operable mechanism for (1) opening and closing the throttle valve means (2) running the engine entirely on injected fuel when the valve means is fully opened and (3) cutting off fuel to the injectors when said valve means is partially open; and an expansible-contractible chamber in vacuum communication with the manifold when said valve means is open but shielded from the manifold when said valve means is closed; said chamber being operably connected with the valve means for causing said valve means to follow the condition of the manually operable mechanism during valve-closing movement.

15. In an internal combustion engine; an intake manifold; carburetor means discharging into said manifold; throttle valve means between said carburetor means and manifold; fuel injectors discharging into the engine cylinders; manually operable mechanism for (1) opening and closing the throttle valve means (2) running the engine entirely on injected fuel when the valve means is fully opened and (3) cutting off fuel to the injectors when said valve means is partially open; said manually operable mechanism including a lost motion connection whereby the throttle means follows movement of the manually operable mechanism during valve-opening movement but remains fully open during the injection period; and an expansible-contractible chamber in vacuum communication with the manifold when said valve means is open but shielded from the manifold when said valve means is closed; said chamber being operably connected with the valve means for causing said valve means to follow the condition of the manually operable mechanism during valve-closing movement.

16. In an internal combustion engine; an intake manifold; carburetor means discharging into said manifold; throttle valve means between said carburetor means and manifold; fuel injectors discharging into the engine cylinders; manually operable mechanisms for (1) opening and closing the throttle valve means (2) running the engine entirely on injected fuel when the valve means is fully opened and (3) cutting off fuel to the injectors when said valve means is partially open; said manually operable mechanism including a lost motion connection whereby the throttle means follows movement of the manually operable mechanism during the injection period; and means operably connected with the valve means for causing said valve means to follow the condition of the manually operable mechanism during valve-closing movement.

17. In an internal combustion engine; an intake manifold; carburetor means discharging into said manifold; throttle valve means between said carburetor means and manifold; fuel injectors discharging into the engine cylinders; manually operable mechanism for (1) opening and closing the throttle valve means (2) running the engine entirely on injected fuel when the valve means is fully opened and (3) cutting off fuel to the injectors when said valve means is partially open; said manually operable mechanism including a slotted plate mounted for movement with the throttle valve means, and a link mounted for movement in the slot, said link being seated at one end of said slot when said throttle means is closed whereby to draw said throttle means open in response to movement of the manually operable mechanism; and an expansible-contractible chamber in vacuum communication with the manifold when said valve means is open but shielded from the manifold when said valve means is closed; said chamber being operably connected with the slotted plate for causing said one end of the slot to engage said link during valve-closing movement.

18. In an internal combustion engine; an intake manifold; carburetor means discharging into said manifold; throttle valve means between said carburetor means and manifold; fuel injectors discharging into the engine cylinders; manually operable mechanism for (1) opening and closing the throttle valve means (2) running the engine entirely on injected fuel when the valve means is fully opened and (3) cutting off fuel to the injectors when said valve means is partially open; said manually operable mechanism including a slotted plate mounted for movement with the throttle valve means, and a link mounted for movement in the slot, said link being seated at one end of said slot when said throttle means is closed whereby to draw said throttle means open in response to movement of the manually operable mechanism; and means operably connected with the slotted plate for causing said one end of the slot to engage said link during valve-closing movement.

References Cited in the file of this patent

UNITED STATES PATENTS

| | | |
|---|---|---|
| 2,283,370 | Jedrzykowski | May 19, 1942 |

FOREIGN PATENTS

| | | |
|---|---|---|
| 149,595 | Austria | May 10, 1937 |
| 521,411 | Great Britain | May 21, 1940 |